Patented July 29, 1947

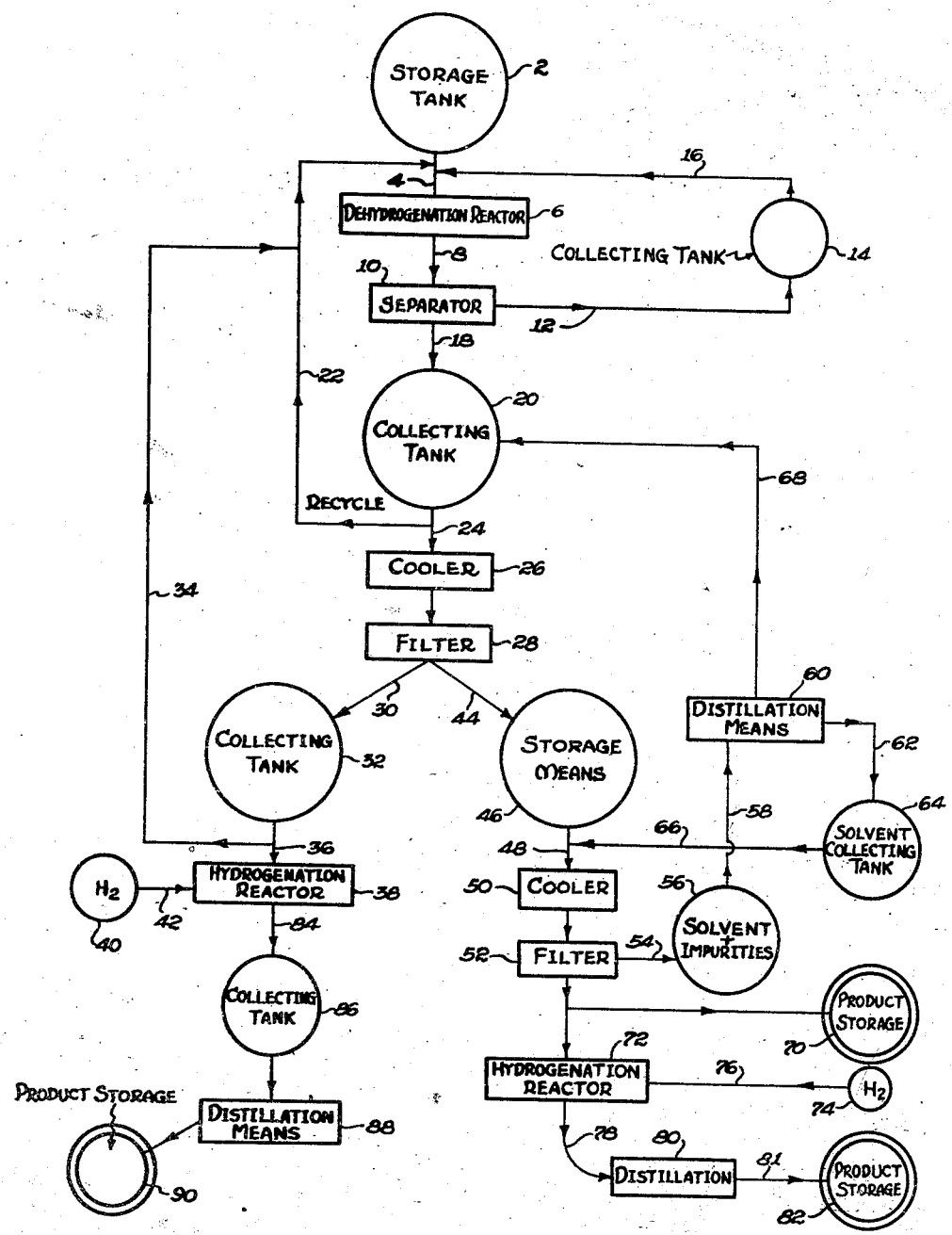

2,424,841

UNITED STATES PATENT OFFICE 2,424,841

SEPARATION OF ALKYL AND ALKYLENE NAPHTHALENE ISOMERS

Joseph E. Nickels, Pittsburgh, Pa., assignor to Koppers Company, Inc., Pittsburgh, Pa., a corporation of Delaware Application July 17, 1945, Serial No. 605,613

10 Claims. (Cl. 260—669)

The present invention relates to a process for separation of isomers of alkyl and alkylene aromatic hydrocarbons. It has particular reference to the separation of alpha and beta isomers of ethyl and vinylnaphthalenes.

Ethylnaphthalenes are commonly produced by the catalytic alkylation of naphthalene, by which process a reaction product is obtained that comprises a mixture of usually approximately equal proportions of alpha and beta ethylnaphthalene. The separation of these isomers by such standard means of physical treatment as distillation is infeasible because of the almost identical boiling points of the isomers. When the described crude mixture of alpha and beta ethylnaphthalene is dehydrogenated by known catalytic methods, a similar mixture of alpha and beta vinylnaphthalene is obtained. The beta vinylnaphthalene is at least in part substantially readily separable from the reaction mixture by cooling to below 0° C. and crystallization. The mother liquor from said crystallization has now been found to contain besides remaining uncrystallized beta vinylnaphthalene a substantial proportion of alpha vinylnaphthalene and unreacted alpha and beta ethylnaphthalene.

The separated isomers of the above named compounds have been shown to exhibit in some instances diverse characteristics insofar as the nature of the polymerization products of them is concerned. The separation of these isomers into their alpha and beta forms has also been found useful in organic synthesis, such for example as the preparation of dyestuffs intermediates.

The primary object of the present method is the provision of an improved process for the separation of isomers of alkyl and alkylene aromatic hydrocarbons.

Another object, of more specific nature, comprehends the provision of a method for the separation of alpha and beta ethyl and vinyl naphthalene.

A further object of the invention is the provision of a process for manufacture of substantially pure beta vinyl and beta ethyl naphthalene.

The invention has for further objects such other operative advantages or results as may be found to obtain in the processes hereinafter described or claimed.

Briefly stated, the present invention consists in catalytically dehydrogenating the crude mixture of alpha and beta ethylnaphthalene such as is produced by known alkylation methods, cooling the dehydrogenation product to a temperature at least below 0° C. and preferably to a much lower temperature, and thereby crystallizing from the reaction product a major proportion of the beta vinylnaphthalene contained therein. Thereafter the mother liquor, containing unprecipitated beta vinylnaphthalene, alpha vinylnaphthalene, and unreacted ethylnaphthalene, may be recycled to a second dehydrogenation step whereby a further portion of the ethylnaphthalene can be converted to vinylnaphthalene. Again beta vinylnaphthalene is fractionally crystallized from the reaction mixture. The resultant mother liquor may be recycled again into contact with further quantities of ethyl naphthalene and be thereafter dehydrogenated and the process repeated until the mother liquor contains a substantially concentrated solution of technical alpha vinylnaphthalene which is particularly useful in such form and can be employed as a solution in chemical reactions such, for example, as polymerization or hydrogenation. By such described means, both alpha and beta vinylnaphthalenes can be separated in economically enhanced form. The so-separated beta and alpha vinylnaphthalenes are thereafter separately hydrogenated to form respectively the substantially pure beta ethylnaphthalene and alpha ethylnaphthalene.

The above process provides relatively simple means for the separation of the ethylnaphthalene isomers, and moreover provides a process for their separation which does not involve the use of chemicals and thus avoids their cost and adventitious interference with purity of the products. Economically, an important advantage of the present process is that it utilizes commercial ethylnaphthalene products, which contain approximately equal amounts of the two said isomers.

The drawing is a diagrammatic flow sheet showing a preferred process to effect the separation of alpha and beta ethylnaphthalene according to the process of invention.

Technical ethylnaphthalene can be made by pumping a mixture of naphthalene and ethylene of which naphthalene is in preponderate proportion, under pressure and at elevated temperature over a catalyst which can be, for example, metal salts, particularly aluminum chloride, mineral acids, metal oxides or activated clays. Technical ethylnaphthalene manufactured in such manner is stored in a collecting tank 2 from which it is flowed through a pipe 4 to a reactor 6 wherein the technical mixture is dehydrogenated.

The dehydrogenation phase of the process is usually conducted at atmospheric pressure, although sub-atmospheric pressures may be used with equally as good or in some instances even better results. The temperature employed depends somewhat on the catalyst being used and ranges from about 550° C. to 700° C., with a preferred range of 600° C. to 650° C. A catalyst, such as, for example, readily- and difficultly-reducible metal oxides of aluminum, calcium, and iron, along with promotors, may be used in the conversion or dehydrogenation of ethylnaphthalene to vinylnaphthalene. In the dehydrogenation step an admixture of the vaporized commercial ethylnaphthalene in the ratio of approximately 5 to 20 mols of steam per mol of ethylnaphthalene, is brought into contact with the catalyst for about 0.3 to 1.8 seconds, whereby there is obtained a product comprising from 30 to 60% vinylnaphthalene. Other inert gases such as carbon dioxide or nitrogen may be used instead of steam. The dehydrogenated product is flowed through a pipe 8 into a separator 10 wherein the steam is separated as water, flowed from the separator through a pipe 12 into a collecting tank 14, and therefrom returned to the dehydrogenation step through a pipe 16. The dehydrogenated product is flowed from the separator through a pipe 18 into a collecting tank 20. A portion of the product can be recycled from the collecting tank 20 through a pipe 22 to the said reactor 6 for further dehydrogenation. As high as a 75% conversion can be obtained per pass by proper selection of operating conditions and catalyst, but it has been found preferable to operate at a lower conversion per pass over the catalyst which results in a better ultimate vinylnaphthalene yield. The ultimate vinylnaphthalene yield obtainable averages over 85%. The product obtained by such dehydrogenation of a commercial ethylnaphthalene mixture consists of alpha vinylnaphthalene, beta vinylnaphthalene, and unaltered commercial ethylnaphthalene. Dehydrogenation product in the collector 20 is flowed therefrom through a pipe 24 into a cooler 26 in which the temperature of the product is lowered to a temperature below 0° C. and usually to a temperature between —20° and —60° C. Such cooling freezes beta vinylnaphthalene from the said product. The beta vinylnaphthalene is filtered by filter 28 from the motor liquor which contains in major proportion alpha vinylnaphthalene. The mother liquor is flowed from the filter 28 through a pipe 30 into a collecting tank 32 from which a portion thereof can be recycled through a pipe 34 to its junction with pipe 22 and then through the latter pipe into said dehydrogenation reactor 6. The remainder of the mother liquor in the collecting tank 32 can be flowed through the pipe 36 into a catalytic hydrogenation reactor 38 to which hydrogen is supplied from a source 40 through a pipe 42.

The mother liquor can be recycled into the crystallization step until substantially all the beta vinylnaphthalene is removed. The final mother liquor will consist mainly of alpha vinylnaphthalene with some unreacted ethylnaphthalene which remained in the final recycled mixture from the dehydrogenation step. The temperatures employed in the crystallization operation to isolate beta vinylnaphthalene from the mother liquor range from approximately —20° C. to —60° C., the preferred temperature depending upon the concentration of beta vinylnaphthalene mixture. Lower concentrations, of course, require lower temperatures of crystallization. The lower temperatures of crystallization also improve the purity of the alpha vinylnaphthalene remaining in the mother liquor, and it has thus been found preferable to crystallize at temperatures at least below about —30° C.

The purity of the separated beta vinylnaphthalene can be enhanced by recrystallization from a suitable solvent such as methanol or ethanol. For such recrystallization beta vinylnaphthalene which has been filtered after initial crystallization in the filter 28 and has been conveyed therefrom by means of line 44 into storage means 46, is flowed from the storage means in solution in a suitable solvent through a pipe 48 into a second cooler 50. Therein the beta vinylnaphthalene is recrystallized and obtained as white flaky crystals melting at about 65° C. The recrystallized beta vinylnaphthalene is filtered from its mother liquor in filter 52 from which filtrate comprising solvent and impurities is flowed through a pipe 54 into a collecting tank 56. Solvent is flowed from the collecting tank through a pipe 58 to distillation means 60 whereby the solvent is purified. Purified solvent is flowed through a pipe 62 to a solvent collecting tank 64 from which it can be returned through a pipe 66 to the recrystallization step in the cooler 50. Still residue from the said distillation is flowed from distillation means 60 through a pipe 68 to the dehydrogenation product collecting tank 20.

The recrystallized and substantially pure beta vinylnaphthalene is delivered to the storage means 70.

The conversion of vinylnaphthalenes to their corresponding ethylnaphthalenes by hydrogenation takes place readily in the presence of a catalyst even at room temperature. In certain examples of operation in which a nickel catalyst was employed, hydrogenation was performed at room temperature under pressure of hydrogen from 250 to 800 lbs. per square inch. Hydrogenation was also accomplished at atmospheric pressure with the use of the platinum catalyst. Higher temperatures are ordinarily avoided to prevent the polymerization of any of the vinylnaphthalene. However, higher temperatures can be used wherever an inhibitor of polymerization is also employed.

Pure beta vinylnaphthalene from the storage means 70 or directly from the filter 52 can be delivered into a hydrogenation reactor 72 to which hydrogen gas as delivered from a source 74 through a pipe 76. The beta vinylnaphthalene, either in solution or in liquid form at a temperature above its melting point, is therein hydrogenated to beta ethylnaphthalene. The so-produced ethylnaphthalene flows through pipe 78 to distillation means 80 whereby the ethylnaphthalene is purified. The purified beta ethylnaphthalene flows from the distillation means 80 through a pipe 81 into product storage means 82.

Alpha ethylnaphthalene which is produced by catalytic hydrogenation in the said reactor 38 and which is flowed therefrom through a pipe 84 into a collecting tank 86 can be purified also by distillation means 88. Ordinarily impurities comprising largely naphthalene and methylnaphthalene will be distilled off the alpha ethylnaphthalene as a separate cut. Unreacted vinylnaphthalene will be polymerized during the said distillation and remain in the still as residue, together with any other high boiling impurities, from which refined alpha ethylnaphthalene will be distilled and delivered into product storage means 90. Although the alpha ethylnaphthalene that is produced by such distillation is highly refined, a further refinement and a substantially complete purification can be obtained by a recrystallization of the product.

The process of invention comprising the steps of dehydrogenation, fractional crystallization, recirculation of mother liquor to dehydrogenation steps, hydrogenation of both the product of crystallization and mother liquor, and recovery of selected alpha and beta pure products is readily adaptable to continuous operation especially when continuous recirculation of mother liquor is employed to build up the concentration of alpha vinylnaphthalene therein so as to make the same and its hydrogenation product more available for recovery in refined form.

An important factor of the present invention is to be found in the fact that hydrogenation of beta vinylnaphthalene gives beta ethylnaphthalene and that an analogous result is obtained when alpha vinylnaphthalene is so hydrogenated. Substantially pure beta ethylnaphthalene manufactured by the above described process was found to have the following properties:

Boiling point 158.5° C. at 50 mm.
Refractive index 20° C., 1.5995
Density $= d_{4°}^{20°}$, 0.9922

The mother liquor from the final beta vinylnaphthalene crystallization is rich in alpha vinylnaphthalene and as hereinbefore described is converted by hydrogenation to solution at least equally rich in alpha ethylnaphthalene. The hydrogenated alpha ethylnaphthalene can be distilled whereby naphthalene, methylnaphthalene, and the like are separated as distillate. Any non-hydrogenated vinylnaphthalene which may be present will polymerize in the still and the alpha ethylnaphthalene be separable therefrom by further distillation. Thereafter substantially pure alpha ethylnaphthalene can be recovered from the latter distillate by fractional crystallization. The purest alpha ethylnaphthalene obtainable by purification means including the process of invention has the following properties:

Boiling point 159.5° C. at 50 mm.
Refractive index 20° C., 1.6052
Density $= d_{4°}^{20°}$, 1.0017

The invention as hereinabove set forth is embodied in particular form and manner but may be variously embodied within the scope of the claims hereinafter made.

I claim:

1. A process for the preparation and separation of alpha vinylnaphthalene and beta vinylnaphthalene from mixtures of alpha and beta ethylnaphthalenes whereby beta vinylnaphthalene is obtained in substantially pure form and alpha vinylnaphthalene is concentrated to facilitate its purification, comprising: catalytically dehydrogenating said mixture of alpha and beta ethylnaphthalene to form a mixture of alpha and beta vinylnaphthalene; cooling the so-formed dehydrogenation mixture to a temperature at least below 0° C.; crystallizing from the said cooled mixture substantially pure beta vinylnaphthalene by at least one crystallization stage; and recovering alpha vinylnaphthalene in the mother liquor of such crystallization.

2. A process for the preparation and separation of alpha vinylnaphthalene and beta vinylnaphthalene from mixtures of alpha and beta ethylnaphthalenes in proportions of similar order whereby beta vinylnaphthalene is obtained in substantially pure form, comprising: catalytically dehydrogenating said mixture of alpha and beta ethylnaphthalene to form a mixture of alpha and beta vinylnaphthalene; cooling the so-formed dehydrogenation mixture to a temperature between −30° and −60° C.; crystallizing from the said cooled mixture substantially pure beta vinylnaphthalene; crystallizing by further cooling further quantities of beta vinylnaphthalene from the mother liquor of the first said crystallization step; and recovering alpha vinylnaphthalene in the mother liquor of the second stage of crystallization.

3. A process for the preparation and separation of alpha vinylnaphthalene and beta vinylnaphthalene from mixtures of alpha and beta ethylnaphthalenes in proportions of similar order whereby beta vinylnaphthalene is obtained in substantially pure form, comprising: catalytically dehydrogenating said mixture of alpha and beta ethylnaphthalene to form a mixture of alpha and beta vinylnaphthalene; cooling the so-formed dehydrogenation mixture to a temperature between −30° and −60° C.; crystallizing from the said cooled mixture by at least one crystallization step beta vinylnaphthalene; returning mother liquor from such crystallization to the aforesaid dehydrogenation step and into admixture with additional ethylnaphthalene, whereby the ratio of alpha to beta vinylnaphthalene is increased in the product of dehydrogenation; and recovering alpha vinylnaphthalene in the mother liquor which has been concentrated as aforesaid in respect of the said alpha product.

4. A process for the preparation and separation of alpha vinylnaphthalene and beta vinylnaphthalene from mixtures of alpha and beta ethylnaphthalenes whereby beta vinylnaphthalene is obtained in substantially pure form, comprising: catalytically dehydrogenating said mixture of alpha and beta ethylnaphthalene to form a mixture of alpha and beta vinylnaphthalene; cooling the so-formed dehydrogenation mixture to a temperature at least below 0° C.; crystallizing out of the said cooled mixture substantially pure beta vinylnaphthalene by at least one crystallization stage; returning mother liquor from a crystallization step to the dehydrogenation step aforesaid; and recovering alpha vinylnaphthalene in another portion of said mother liquor.

5. A continuous process for the preparation and separation of alpha vinylnaphthalene and beta vinylnaphthalene from mixtures of alpha and beta ethylnaphthalenes whereby beta vinylnaphthalene is obtained in substantially pure form, comprising: continuously catalytically dehydrogenating said mixture of alpha and beta ethylnaphthalene to form a mixture of alpha and beta vinylnaphthalene; continuously cooling so-formed dehydrogenation mixture to a temperature at least below 0° C.; continuously crystallizing out of said cooled mixture substantially pure beta vinylnaphthalene by at least one crystallization stage; continuously returning a portion of the mother liquor from a crystallization step to the dehydrogenation step aforesaid; and continuously recovering alpha vinylnaphthalene from another portion of said mother liquor in which alpha vinylnaphthalene has been concentrated by recirculation to dehydrogenating steps and repeated subsequent crystallization therefrom of beta vinylnaphthalene.

6. A process of preparing and separating alpha vinylnaphthalene and beta vinylnaphthalene from mixtures of alpha and beta ethylnaphthalene, comprising: catalytically dehydrogenating said mixture of alpha and beta ethylnaphthalene at a temperature of 550° to 700° C. to form a mixture of alpha and beta vinylnaphthalene and unconverted material; cooling the so-formed mixture to a temperature at least below 0° C.; crystallizing out of the said cooled mixture substantially pure beta vinylnaphthalene; returning a portion of the mother liquor containing said unconverted material, from the crystallization step aforesaid to the said dehydrogenation step; crystallizing by further cooling further quantities of beta vinylnaphthalene from the remainder of mother liquor of the first crystallization step; and recovering alpha vinylnaphthalene from the mother liquor of the second stage of crystallization.

7. A process of separating alpha and beta ethylnaphthalene from crude mixtures thereof that are produced by the catalytic alkylation of naphthalene, comprising: catalytically dehydrogenating said mixture of alpha and beta ethylnaphthalene thereby to form a mixture comprising alpha and beta vinylnaphthalene; cooling the so-formed dehydrogenation mixture to a temperature at least below 0° C.; crystallizing out of the said cooled mixture substantially pure beta vinylnaphthalene; hydrogenating the so-formed beta vinylnaphthalene thereby providing substantially pure beta ethylnaphthalene; and hydrogenating the mother liquor from said crystallization step, which liquor contains alpha vinylnaphthalene to produce alpha ethylnaphthalene; and recovering from the hydrogenated mother liquor alpha ethylnaphthalene.

8. A process of separating alpha and beta ethylnaphthalene from crude mixtures thereof that are formed by the catalytic alkylation of naphthalene, comprising: catalytically dehydrogenating such crude mixture and thereby forming a mixture of alpha and beta vinylnaphthalene and unconverted materials; cooling this dehydrogenation mixture to a temperature between −30° and −60° C.; crystallizing substantially pure beta vinylnaphthalene from the so-cooled dehydrogenation mixture; catalytically hydrogenating the so-separated beta vinylnaphthalene to substantially pure beta ethylnaphthalene; hydrogenating the mother liquor from the above said crystallization step; and recovering from the hydrogenated mother liquor a technical grade alpha ethylnaphthalene.

9. A continuous process of separating alpha and beta ethylnaphthalene from crude mixtures thereof, comprising: continuously dehydrogenating the said ethylnaphthalene with a dehydrogenation catalyst at a temperature between 600° and 650° C.; continuously separating the so-formed dehydrogenation products from the hydrogen formed therewith and recycling the said products into further contact with dehydrogenating catalyst and repeating the said recirculation until an optimum ultimate yield of dehydrogenated product is obtained; continuously cooling the dehydrogenated mixture comprising at least about 85% vinylnaphthalene, to a temperature between about −30° to −60° C.; continuously crystallizing beta vinylnaphthalene from the so-cooled vinylnaphthalene mixture; continuously recycling mother liquor to the aforesaid cyclic dehydrogenation step, and thereby providing a dehydrogenation product containing a preponderance of alpha vinylnaphthalene; recrystallizing the beta vinylnaphthalene from alcohol; continuously hydrogenating the so-purified beta vinylnaphthalene and thereby forming substantially pure beta ethylnaphthalene; and hydrogenating another portion of the mother liquor from the said crystallization step forming thereby alpha ethylnaphthalene; and separating substantially pure alpha ethylnaphthalene from the hydrogenation mixture by means of distillation and subsequent crystallization.

10. A process of separating alpha and beta ethylnaphthalene in substantially pure form from crude mixtures thereof, comprising: catalytically dehydrogenating a crude mixture of alpha and beta ethylnaphthalene to form a mixture of alpha and beta vinylnaphthalene; cooling the so-formed dehydrogenation mixture to a temperature between −30° and −60° C.; crystallizing out of the said cooled mixture substantially pure beta vinylnaphthalene by at least one crystallization stage; returning mother liquor from said crystallization to the aforesaid dehydrogenation step and into admixture with additional ethylnaphthalene, whereby the ratio of alpha to beta vinylnaphthalene is increased in the product of dehydrogenation; hydrogenating alpha vinylnaphthalene in mother liquor, which has become concentrated as aforesaid in respect of the alpha vinylnaphthalene, to produce alpha ethylnaphthalene; and hydrogenating the crystallized beta vinylnaphthalene thereby providing pure beta ethylnaphthalene.

JOSEPH E. NICKELS.

REFERENCES CITED

The following references are of record in the file of this patent:

UNITED STATES PATENTS

| Number | Name | Date |
| --- | --- | --- |
| 1,836,211 | Weiland et al. | Dec. 15, 1931 |
| 1,552,874 | Ostromislensky et al. | Sept. 8, 1925 |
| 1,985,844 | Suida | Dec. 25, 1934 |

OTHER REFERENCES

Zal'kind et al., Chem. Abs., vol. 36, 2548–9 (1942). (Pat. Off. Lib.)